United States Patent [19]
Seyed-Bolorforosh et al.

[11] Patent Number: 5,865,752
[45] Date of Patent: Feb. 2, 1999

[54] METHOD AND APPARATUS FOR ULTRASOUND IMAGING USING NORMALIZED DIFFERENCE BETWEEN SUCCESSIVE FRAMES

[75] Inventors: Mir Said Seyed-Bolorforosh, Brookfield; David John Muzilla, Mukwonago; David D. Becker; Doralie Martinez, both of Milwaukee; Xiao-Liang Xu, Brookfield, all of Wis.

[73] Assignee: General Electric Company, Milwaukee, Wis.

[21] Appl. No.: 858,205

[22] Filed: May 7, 1997

[51] Int. Cl.$^6$ ............................................. A61B 8/00
[52] U.S. Cl. ............................................. 600/454; 600/453
[58] Field of Search ................................. 600/454, 455, 600/443, 453, 463, 441; 382/54, 6; 128/662.03; 367/11

[56] References Cited

U.S. PATENT DOCUMENTS 4,785,818  11/1988  Hardin ................................. 600/443
5,357,580  10/1994  Forestieri et al. ........................ 382/6
5,467,770  11/1995  Smith et al. ........................... 600/454

Primary Examiner—Marvin M. Lateef
Assistant Examiner—Ali M. Imam
Attorney, Agent, or Firm—Dennis M. Flaherty; Christian G. Cabou; Phyllis Y. Price

[57] ABSTRACT

A method and an apparatus for frame averaging ultrasound imaging data. A one-tap IIR filter is used to average the corresponding pixel data of two frames. The frame averaging is a function of a normalized difference between the pixel data of the two frames. This is achieved by taking the absolute difference between the signal levels of the current frame and the previous frame and dividing the result by the arithmetic (or geometric) mean of the two data. A multitude of look-up tables of output values are generated off-line. Each look-up table is designed to be used under a specific set of operating parameters. In response to the user's selection of these operating parameters, the system downloads a selected frame-averaging look-up table from system memory. During subsequent system operation, the downloaded look-up table outputs values which are a function of the normalized difference between the previous and current frame data used to address the look-up table.

18 Claims, 3 Drawing Sheets

METHOD AND APPARATUS FOR ULTRASOUND IMAGING USING NORMALIZED DIFFERENCE BETWEEN SUCCESSIVE FRAMES

FIELD OF THE INVENTION

This invention generally relates to ultrasound imaging of the human anatomy for the purpose of medical dialogists. In particular, the invention relates to a method and an apparatus for imaging of moving fluid or tissue in the human body by detecting Doppler shifting of ultrasonic echoes reflected from the moving fluid or tissue.

BACKGROUND OF THE INVENTION

Conventional ultrasound scanners create two-dimensional B-mode images of tissue in which the brightness of a pixel is based on the intensity of the echo return. In color flow imaging, the flow of blood or movement of tissue can be imaged. Measurement of blood flow in the heart and vessels using the Doppler effect is well known. The frequency shift of backscattered ultrasound waves may be used to measure the velocity of the back-scatterers from tissue or blood. The frequency of sound waves reflecting from the inside of blood vessels, heart cavities, etc. is shifted in proportion to the velocity of the blood cells: positively shifted for cells moving towards the transducer and negatively for those moving away. The Doppler shift may be displayed using different colors to represent speed and direction of flow. The color flow mode displays hundreds of adjacent sample volumes simultaneously, all color-coded to represent each sample volume's velocity. The color flow image may be superimposed on the B-mode image.

The present invention is incorporated in an ultrasound imaging system consisting of four main subsystems: a beamformer 2 (see FIG. 1), processor subsystem 4, a scan converter/display controller 6 and a master controller 8. System control is centered in master controller 8, which accepts operator inputs through an operator interface (not shown) and in turn controls the various subsystems. The master controller also generates the system timing and control signals which are distributed via a system control bus 10 and a scan control bus (not shown).

The main data path begins with the digitized RF inputs to the beamformer from the transducer. The beamformer outputs two summed digital baseband receive beams. The baseband data is input to B-mode processor 4A and color flow processor 4B, where it is processed according to the acquisition mode and output as processed acoustic vector (beam) data to the scan converter/display processor 6. The scan converter/display processor 6 accepts the processed acoustic data and outputs the video display signals for the image in a raster scan format to a color monitor 12. The scan converter/display controller 6, in cooperation with master controller 8, also formats multiple images for display, display annotation, graphics overlays and replay of cine loops and recorded timeline data.

The B-mode processor 4A converts the baseband data from the beamformer into a log-compressed version of the signal envelope. The B function images the time-varying amplitude of the envelope of the signal as a grey scale using an 8-bit output for each pixel. The envelope of a baseband signal is the magnitude of the vector which the baseband data represent.

The color flow (CF) processor 4B is used to provide a real-time two-dimensional image of blood velocity in the imaging plane. The blood velocity is calculated by measuring the phase shift from firing to firing at a specific range gate. Instead of measuring the Doppler spectrum at one range gate in the image, mean blood velocity from multiple vector positions and multiple range gates along each vector are calculated, and a two-dimensional image is made from this information. The structure and operation of a color flow processor are disclosed in U.S. Pat. No. 5,524,629.

The color flow processor produces velocity (8 bits), variance (turbulence) (4 bits) and power (8 bits) signals. The operator selects whether the velocity and variance or the power are output to the scan converter. The output signal is input to a chrominance control lookup table which resides in the video processor 22. Each address in the lookup table stores 24 bits. For each pixel in the image to be produced, 8 bits control the intensity of red, 8 bits control the intensity of green and 8 bits control the intensity of blue. These bit patterns are preselected such that as the flow velocity changes in direction or magnitude, the color of the pixel at each location is changed. For example, flow toward the transducer is typically indicated as red and flow away from the transducer is typically indicated as blues The faster the flow, the brighter the color.

In a conventional ultrasound imaging system, wall filters and compression curves are applied to the beam-formed color flow data, positive and negative velocities are estimated, post-processing such as frame averaging and thresholding are applied, and then the data is displayed using a color map whereby positive and negative flow states are represented by different colors and/or intensities.

The acoustic line memories 14A and 14B of the scan converter/display controller 6 respectively accept processed digital data from processors 4A and 4B and perform the coordinate transformation of the color flow and B-mode data from polar coordinate (R—θ) sector format or Cartesian coordinate linear array to appropriately scaled Cartesian coordinate display pixel data stored in X-Y display memory 18. In the B-mode, intensity data is stored X-Y display memory 18, each address storing three 8-bit pixels. Alternatively, in the color flow mode, data is stored in memory as follows: intensity data (8 bits), velocity or power data (8 bits) and variance (turbulence) data (4 bits).

A multiplicity of successive frames of color flow or B-mode data are stored in a cine memory 24 on a first-in, first out basis. The cine memory is like a circular image buffer that runs in the background, continually capturing image data that is displayed in real time to the user. When the user freezes the system, the user has the capability to view image data previously captured in cine memory. The graphics data for producing graphics overlays on the displayed image is generated and stored in the timeline/graphics processor and display memory 20. The video processor 22 multiplexes between the graphics data, image data, and timeline data to generate the final video output in a raster scan format on video monitor 12. Additionally it provides for various greyscale and color maps as well as combining the greyscale and color images.

Conventional ultrasound imaging systems normally have an image frame averaging function which acts on data in either polar or Cartesian coordinate format. An infinite impulse response (IIR) filter is normally used to carry out this function. This form of filter combines new incoming image data with old stored image data. The combination of image data is formed in accordance with the following summation:

$$\text{Filter Output} = (\text{WEIGHT1} \times \text{Old Datum}) + (\text{WEIGHT2} \times \text{New Datum})$$

where WEIGHT1 and WEIGHT2 are constants. The sum of WEIGHT1 and WEIGHT2 is normally unity. The purpose of this frame averaging function is to smooth the image by reducing speckle artifact and noise.

In a conventional ultrasound imaging system, frame averaging of velocity data must consider the sign and magnitude of the data to determine whether the flow has aliased, and then adjust for the aliasing in the algorithm. Frame averaging across the alias boundary is difficult and an algorithm which must handle aliasing will have sub-optimal performance on non-aliased data.

SUMMARY OF THE INVENTION

The present invention is a method and an apparatus for frame averaging ultrasound imaging data. The function of the frame averaging is to take data from two or more frames and perform an averaging in the temporal domain. The result of frame averaging is that sudden changes in the display intensity are reduced.

The frame averaging apparatus comprises a one-tap IIR (infinite Impulse Response) filter which averages the corresponding pixel data of two frames. The frame averaging is a function of a normalized difference between the pixel data of the two frames. This is achieved by taking the absolute difference between the signal levels of the current frame and the previous frame and dividing the result by the arithmetic (or geometric) mean of the two data. As a result, the frame averaging is able to detect changes in the signal level for small signals. The frame averaging technique of the invention can be applied to B-mode intensity data or to color flow mode velocity or power data.

In accordance with a further aspect of the invention, a multitude of look-up tables of frame-averaged output values are generated off-line based on persistence coefficients computed using a nonlinear function of the normalized difference between the previous and current frame data. Each look-up table is designed to be used under a specific set of operating parameters. In particular, the frame-averaged output values included in a given look-up table depend on at least the following factors: the number of active transmit focal zones, the acoustic frame rate and the persistence level—all of which can be selected by the system operator. In response to the user's selection of these operating parameters, the system downloads a selected look-up table from the system memory. During subsequent system operation, the downloaded look-up table outputs frame-averaged values in response to being addressed with a current frame of non-frame-averaged pixel data and a previous frame of frame-averaged pixel data.

DETAILED DESCRIPTION OF THE PREFERRED EMBODIMENTS

Figure 1:
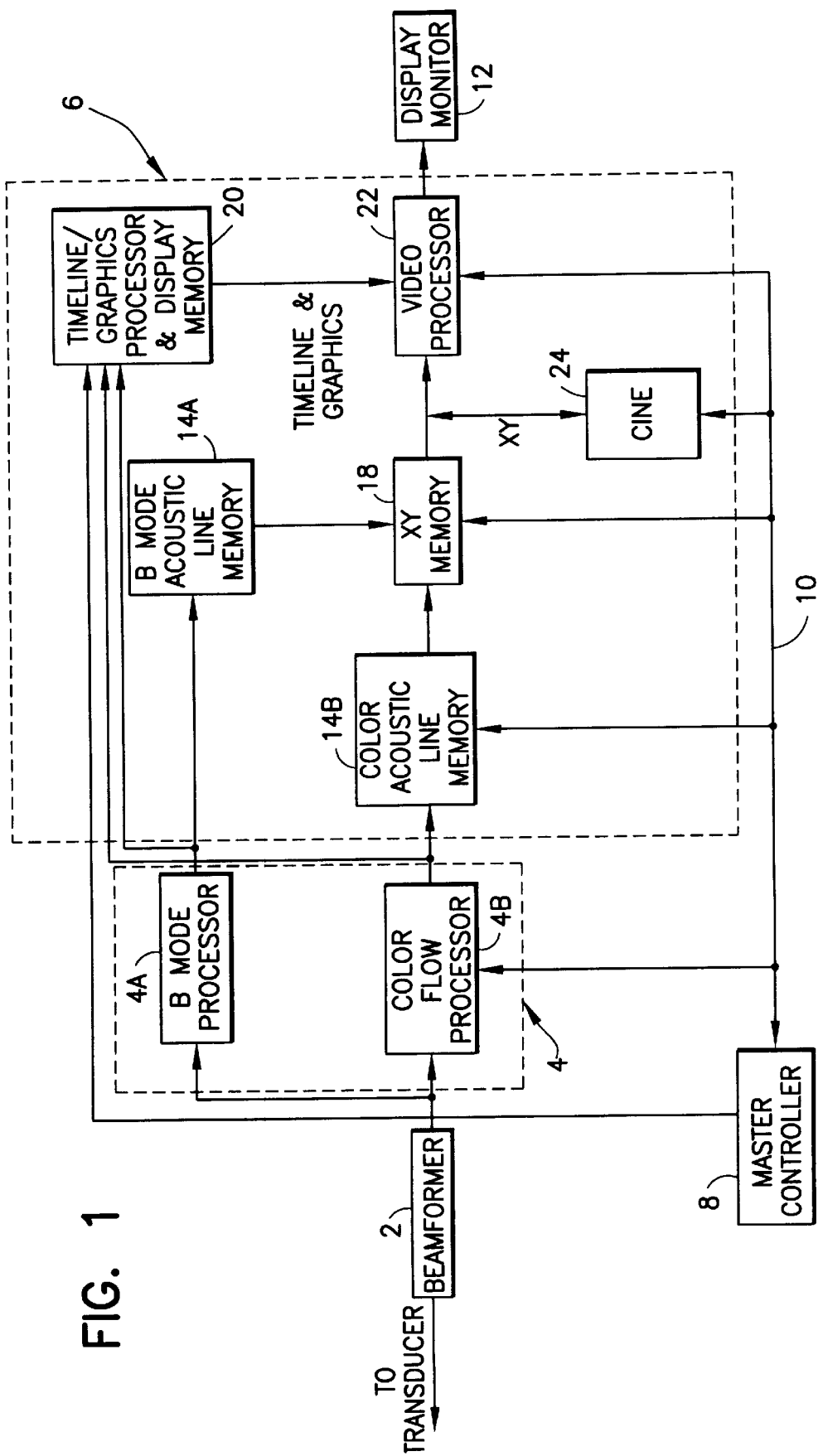
FIG. 1 is a block diagram showing the major functional subsystems within a real-time ultrasound imaging system.

In accordance with the preferred embodiment of the present invention, the X-Y display memory 18 (see FIG. 1) has a look-up table of output values which represent frame-averaged data. This frame-averaged data is generated off-line using the algorithm depicted in FIG. 2. The outputs $Y_n$, computed in accordance with the algorithm are stored as part of the look-up table.

The frame-averaging circuit of the present invention comprises a random access memory (RAM) located on the X-Y display memory board. The RAM has two inputs and an output. The look-up table is stored in the RAM. One input receives the current frame of non-frame-averaged pixel data. The other input receives the previous frame of frame-averaged pixel data via a time delay device which delays the previous frame data by a time equal to the inverse of the frame rate.

Figure 2:
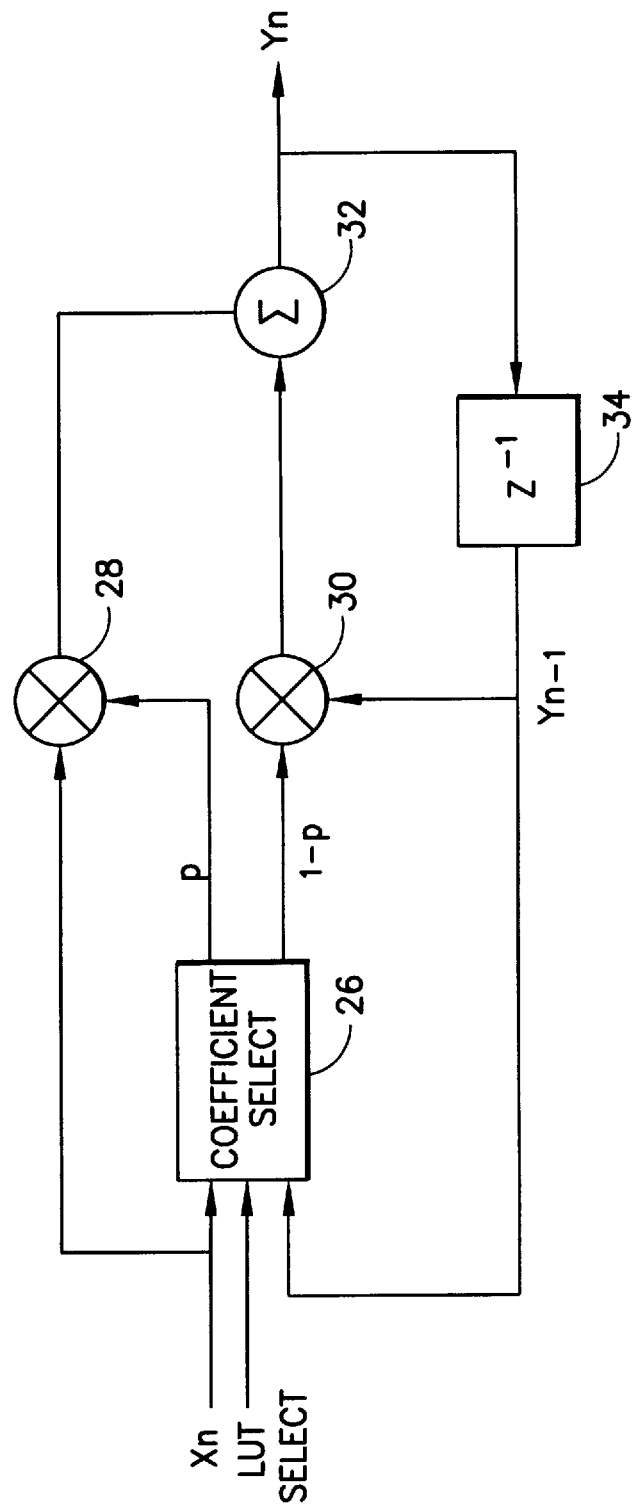
FIG. 2 is a schematic block diagram showing the algorithm for generating the output values to be included in the frame averaging look-up table in accordance with the present invention.

The frame-averaging filtering function is implemented off-line by the algorithm depicted in FIG. 2. The filter outputs are stored on-line in the form of the look-up table. The algorithm comprises a coefficient select step 26 in which persistence coefficients are computed and selected. The coefficient selection is a function of the acoustic frame rate, the number of focal zones and the desired persistence level. These factors are grouped together and indicated in FIG. 2 as an "LUT SELECT" input.

In the algorithm, the selected persistence coefficient p is output to one input of a first multiplier 28. The other input of multiplier 28 represents the unfiltered current frame input $X_n$. Thus the output of multiplier 28 is the product $pX_n$. As a result of the coefficient selection step 26, the value $(1-p)$ is output to one input of a second multiplier 30. The other input of multiplier 30 represents the frame-averaged previous frame output $Y_{-1}$ from a time delay device 34, which provides a delay equal to the inverse of the frame rate. Thus, the output of multiplier 30 is the product $(1-p)Y_{n-1}$. The outputs of both multipliers are input to a summer 32, which in turn yields the frame-averaged current frame output:

$$Y_n = pX_n + (1-p)Y_{n-1} \qquad (1)$$

In accordance with the preferred embodiment of the invention, the RAM chip is loaded with a subset of a multiplicity of look-up tables which are generated off-line and contain the output values $Y_n$. The look-up tables are designed for specific operating parameters and are, as previously indicated, a function of the acoustic frame rate, the number of focal zones and the desired persistence level.

Each look-up table consists of a multiplicity of output values $Y_n$ which were generated off-line by the frame-averaging algorithm of the present invention. In response to the selection of various operating parameters by the system operator, the appropriate look-up table is downloaded into the RAM chip. This look-up table is then addressed by the combined inputs of the unfiltered current frame input $X_n$ and the frame-averaged previous frame output $Y_{n-1}$ to select the outputs $Y_n$ which are the result of the off-line frame-averaging filtering function.

In accordance with the frame-averaging method of the present invention, the output values $Y_n$ are precomputed using persistence coefficients which are a function of the normalized difference $\Delta_{norm}$ between the signal levels of the previous frame and the current frame. This is achieved by taking the absolute difference between the signal levels of the current frame and the previous frame and dividing the result by the arithmetic (or geometric) mean of the two data:

$$\Delta_{norm}=|X_n-Y_{-1}|/(|X_n+Y_{-1}|/2) \quad (2)$$

The result of Eq. (2) is used to determine the amount of persistence in the image. The persistence is defined by how much of the data in the previous and current frames are to be used to determine the output signal $Y_n$, where the persistence coefficient p is either:

$$p=1-f(-((\Delta_{norm}-k_1)k_2)+k_4)^{k_3} \quad (3)$$

or $$p=k+f(((\Delta_{norm}-k_1)k_2)+k_4)^{k_3} \quad (4)$$

where f is a nonlinear function, and k, $k_1$, $k_2$, $k_3$ and $k_4$ are constants having values dependent on the number of active transmit focal zones, the acoustic frame rate and persistence level selected by the system operator. The preferred f function is the exponential (exp) function for Eq. (3) and the hyperbolic tangent (tanh) function for Eq. (4). The preferred method for precomputing the frame-averaged output values uses persistence coefficients generated in accordance with Eq. (4) using the tanh function.

An output value $Y_n$ is computed for each possible pair of $X_n$ and $Y_{n-1}$ values for each one of a multiplicity of sets of operating conditions. The output values $Y_n$ are stored as separate look-up tables in system memory, one unique look-up table for each set of operating conditions. The appropriate look-up table is stored in the RAM chip in response to selection of the desired operating conditions, e.g., acoustic frame rate, number of focal zones and persistence level, by the system operator. The pixel data is then frame-averaged in accordance with the filter output values read from the look-up table for as long as the selected operating parameters remain in effect. The input data can be either scan-converted frame data or acoustic line data (non-scan-converted).

Figure 4:
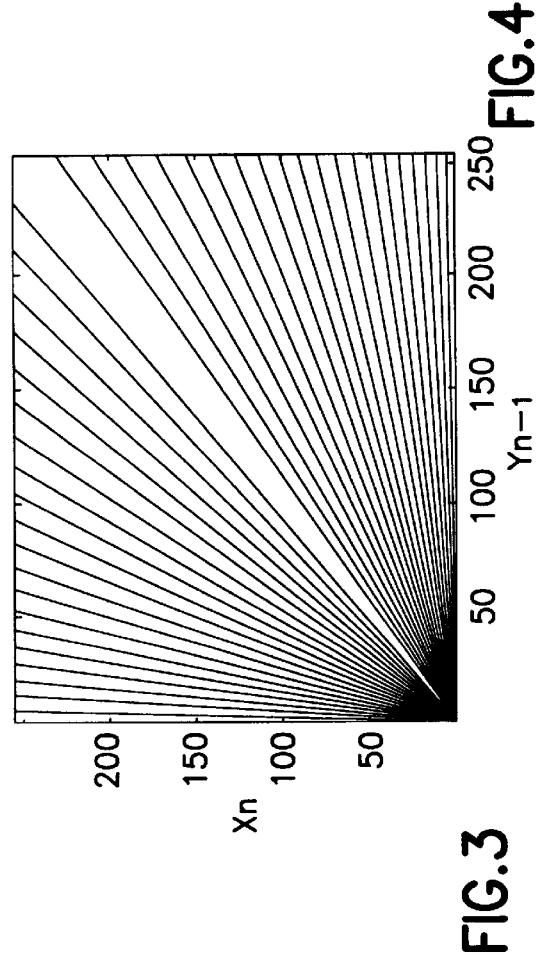
FIGS. 4–6 are graphs depicting two-dimensional persistence surfaces for three exemplary look-up tables generated in accordance with the present invention. Each look-up table stores output values computed using persistence coefficients which are a function of the normalized difference between the current and previous frame data.
Figure 6:
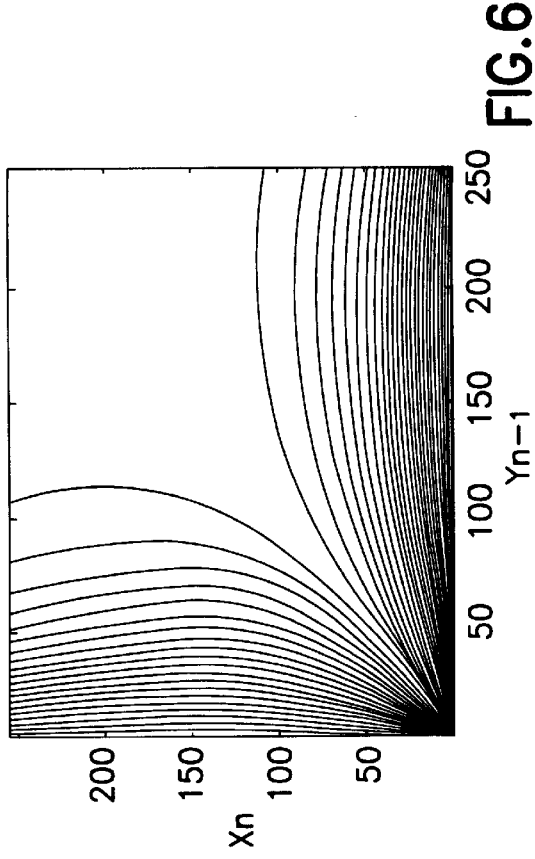
Figure 3:
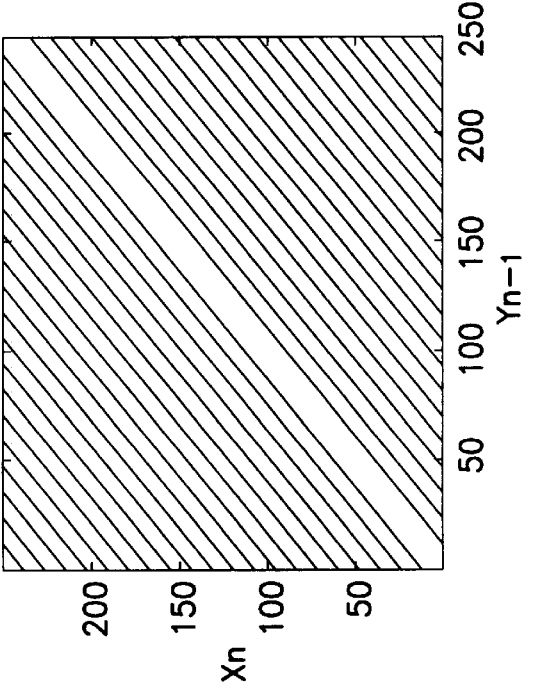
FIG. 3 is a graph depicting a two-dimensional persistence surface showing lines of constant persistence for a conventional frame averaging filter which uses persistence coefficients which are a function of the absolute difference between the current and previous frame data.
Figure 5:
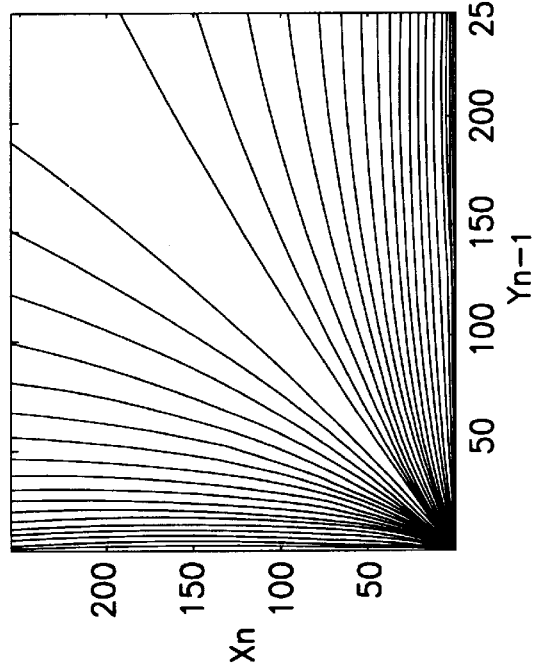

FIG. 3 shows the two-dimensional persistence surface for a conventional frame averaging filter having persistence coefficients which are a function of the absolute difference between the current and previous frame data. FIGS. 4–6 show two-dimensional persistence surfaces for three exemplary look-up tables of the frame averaging filter of the invention. Each look-up table has persistence coefficients which are a function of the normalized difference between the current and previous frame data. A comparison of FIG. 3 with FIGS. 4–6 for small signals shows that the frame averaging technique of the invention provides improved discrimination of signal level changes for small-amplitude signals.

In accordance with an extension of the inventive concept disclosed herein, constraints can be placed for when the signal is increasing or decreasing. If the signal is increasing, the persistence is reduced; if the signal is decaying, then the persistence is increased. This provides a peak detection and hold function.

In accordance with a further extension, if the user sets the persistence at a very high level, the frame averaging can be set such that it incorporates flash rejection capabilities. This can be achieved by limiting the amount of signal increase from the previous frame value to the current frame value when the former is much less than the latter.

In addition, in the case of velocity imaging, which is susceptible to aliasing of the flow data, constraints can be placed on the frame averaging to mitigate aliasing. This can be achieved by a condition whereby, if there is a sign reversal and the absolute difference between the previous and current frame values is larger than a predetermined amount, the previous frame is displayed instead of the current frame.

The foregoing preferred embodiment has been disclosed for the purpose of illustration. Variations and modifications of the basic concept of the invention will be apparent to persons skilled in the art. All such variations and modifications are intended to be encompassed by the claims set forth hereinafter.

We claim:

1. A system for imaging ultrasound-scattering matter, comprising:

an ultrasound transducer array for transmitting ultrasound beams and detecting ultrasound echoes reflected by said ultrasound-scattering matter;

means for acquiring successive frames of pixel data derived from said detected ultrasound echoes;

a frame-averaging filter programmed with filter coefficients to generate a frame of output frame-averaged pixel data as a linear function of a current frame of non-frame-averaged pixel data, a previous frame of frame-averaged data and a persistence coefficient; and means for displaying said frame of output frame-averaged pixel data, wherein said persistence coefficient is a non-linear function of a normalized difference between said current frame data and said previous frame data.

2. The system as defined in claim 1, wherein said nonlinear function comprises a factor dependent on the acoustic frame rate.

3. The system as defined in claim 1, wherein said nonlinear function comprises a factor dependent on the number of active transmit focal zones.

4. The system as defined in claim 1, wherein said nonlinear function comprises a factor dependent on the level of persistence.

5. The system as defined in claim 1, wherein said nonlinear function is a tanh function.

6. The system as defined in claim 1, wherein said frame-averaging means comprise a random access memory for storing said output frame-averaged pixel data in the form of a look-up table, said random access memory having address inputs connected to receive said non-frame-averaged pixel data of said current frame and said frame-averaged pixel data of said previous frame.

7. A method for imaging ultrasound-scattering matter, comprising the steps of:

transmitting ultrasound beams into said ultrasound-scattering matter;

detecting ultrasound echoes reflected from said ultrasound-scattering matter;

acquiring successive frames of pixel data derived from said detected ultrasound echoes;

generating a frame of output frame-averaged pixel data as a linear function of a current frame of non-frame-averaged pixel data, a previous frame of frame-averaged data and a persistence coefficient; and displaying said frame of output frame-averaged pixel data, wherein said persistence coefficient is a non-linear function of a normalized difference between said current frame data and said previous frame data.

8. The method as defined in claim 7, wherein said nonlinear function comprises a factor dependent on the acoustic frame rate.

9. The method as defined in claim 7, wherein said nonlinear function comprises a factor dependent on the number of active transmit focal zones.

10. The method as defined in claim 7, wherein said nonlinear function comprises a factor dependent on the level of persistence.

11. The method as defined in claim 7, wherein said nonlinear function is a tanh function.

12. A method for configuring a frame-averaging filter in dependence on selected operating parameters of an ultrasound imaging system, comprising the steps of:

generating a multiplicity of look-up tables of frame-averaging output values, each one of said look-up tables corresponding to a respective set of operating parameters;

storing said multiplicity of look-up tables;

detecting a set of operating parameters selected by a user; and downloading the look-up table corresponding to said selected set of operating parameters into an addressable memory.

13. The method as defined in claim 12, wherein said output values are dependent on a normalized difference between a current frame and a previous frame.

14. The method as defined in claim 12, wherein said set of operating parameters includes the acoustic frame rate.

15. The method as defined in claim 12, wherein said set of operating parameters includes the number of active transmit focal zones.

16. The method as defined in claim 12, wherein said set of operating parameters includes the level of persistence.

17. The system as defined in claim 1, wherein said nonlinear function is an exponential function.

18. The method as defined in claim 7, wherein said nonlinear function is an exponential function.

* * * * *